United States Patent

Ichihara

[11] Patent Number: 5,432,663
[45] Date of Patent: Jul. 11, 1995

[54] HEAD POSITIONER HAVING PIVOTABLE MEMBERS

[75] Inventor: Junichi Ichihara, Kawasaki, Japan

[73] Assignee: Fujitsu Limited, Kawasaki, Japan

[21] Appl. No.: 84,982

[22] Filed: Jul. 2, 1993

[30] Foreign Application Priority Data

Jul. 6, 1992 [JP] Japan .................... 4-178503

[51] Int. Cl.6 .................................. G11B 21/02
[52] U.S. Cl. .................................. 360/106
[58] Field of Search .................... 360/105, 106, 109

[56] References Cited

U.S. PATENT DOCUMENTS

| 4,760,478 | 7/1988 | Pal et al. | 360/104 |
| 4,775,907 | 10/1988 | Shtipelman | 360/106 |
| 4,849,840 | 7/1989 | Fujioka | 360/104 |
| 4,860,137 | 8/1989 | Shtipelman | 360/106 |
| 5,140,471 | 8/1992 | Kasahara | 359/824 |
| 5,172,282 | 12/1992 | Ghose | 360/106 |
| 5,267,110 | 11/1993 | Ottesen et al. | 360/106 |

FOREIGN PATENT DOCUMENTS 2-94078  4/1990  Japan .

Primary Examiner—Robert S. Tupper
Assistant Examiner—Brian E. Miller
Attorney, Agent, or Firm—Armstrong, Westerman, Hattori, McLeland & Naughton

[57] ABSTRACT

A head positioner for a storage disk includes an antifriction bearing supported by a stationary base, a first pivotable member pivotably supported by the antifriction bearing, a second pivotable member having a read/write head, a flexible member pivotably supporting the second pivotable member by the first pivotable member, and a driving unit for generating a first driving force causing the second pivotable member to pivot.

12 Claims, 10 Drawing Sheets

FIG.6
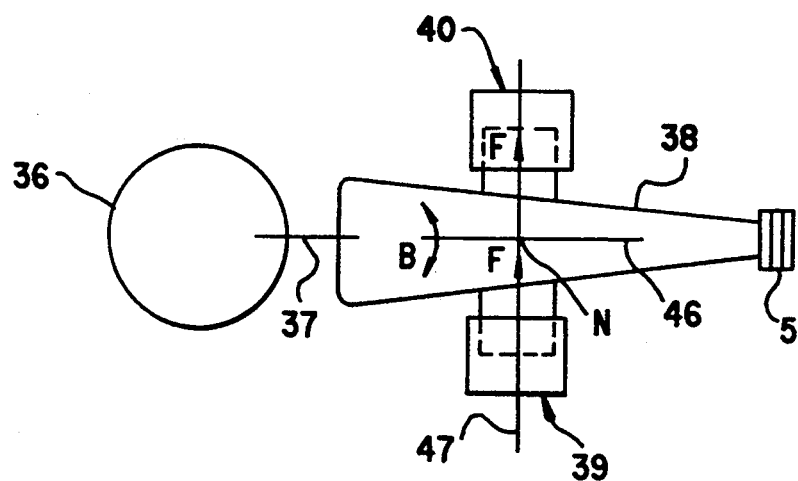
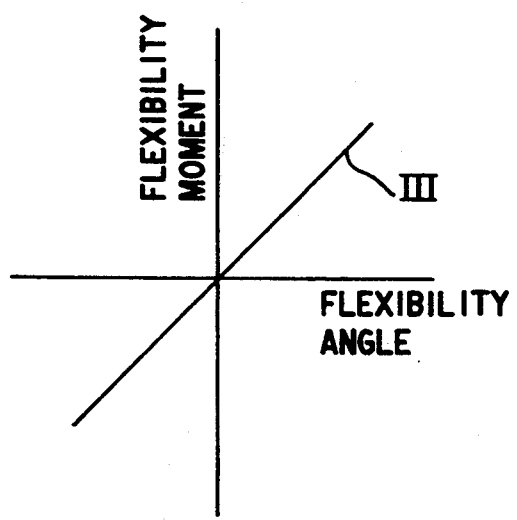
FIG.7

FIG.8
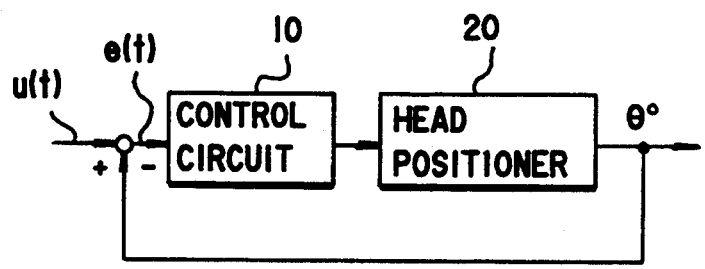
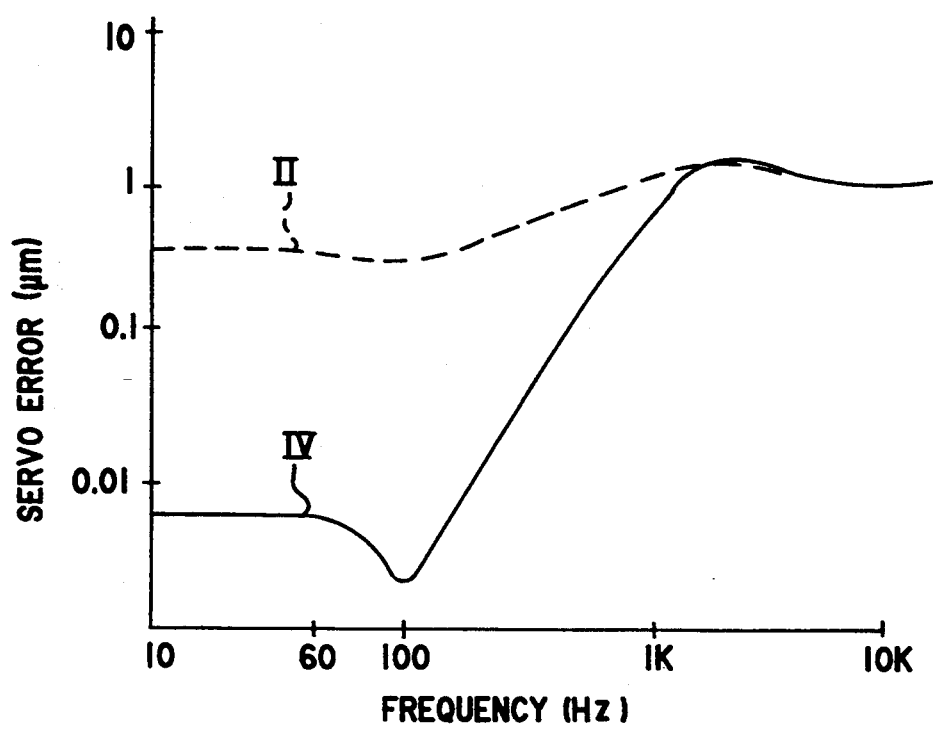
FIG.9

FIG.11
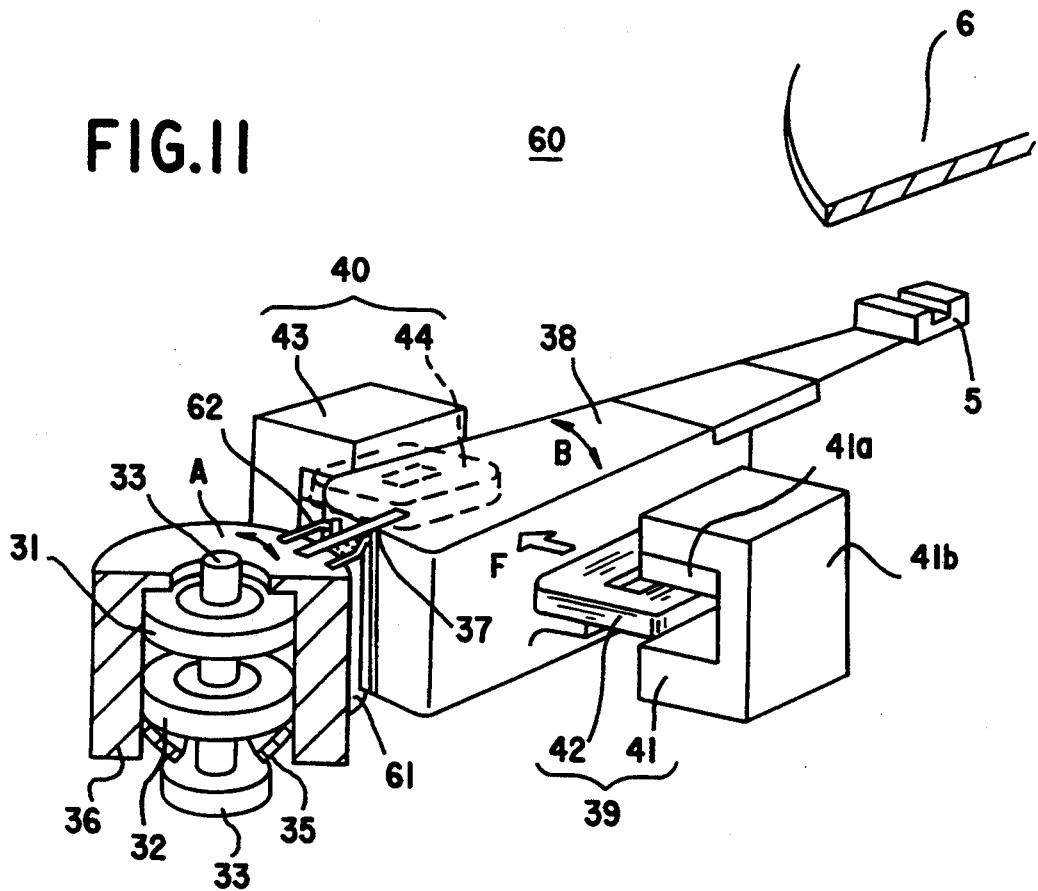
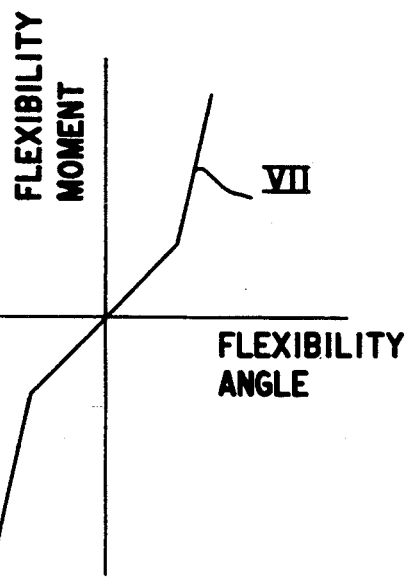
FIG.12

HEAD POSITIONER HAVING PIVOTABLE MEMBERS

BACKGROUND OF THE INVENTION

1. Field of the Invention

The present invention generally relates to head positioners supporting and positioning a read/write head, and more particularly to a head positioner having pivotable members.

2. Description of the Prior Art

Magnetic and optical disks are widely used for storing information. A read/write head is used to record information on the memory or storage disk and to read information therefrom. Recently, the recording density of the disk has been improved, in which tracks are formed on the disk with a high integration density.

In order to precisely record information on the memory disk having a high recording density and read information therefrom, it is necessary to precisely position a read/write head at a target position on a track. In actuality, it is required to position the head on the disk with a submicron order tolerance.

A head positioner supports a read/write head and positions it at a target position on the memory disk. Nowadays, various types of head positioners have been proposed. However, conventional head positioners are not capable of positioning read/write heads with a precision less than 1 $\mu$m measured on the disk.

SUMMARY OF THE INVENTION

It is an object of the present invention to provide a head positioner capable of positioning a read/write head with improved precision, particularly with an error tolerance of less than 1 $\mu$m measured on a memory disk.

The above object of the present invention is achieved by a head positioner for a memory disk, the head positioner comprising: an antifriction bearing supported by a stationary base; a first pivotable member pivotably supported by the antifriction bearing; a second pivotable member having a read/write head, a flexible member pivotably supporting the second pivotable member to the first pivotable member; and first driving means for generating a first driving force causing the second pivotable member to pivot.

BRIEF DESCRIPTION OF THE DRAWINGS

The other objects, features and advantages of the present invention will become more apparent from the following detailed description when read in conjunction with the accompanying drawings, in which:

FIG. 6 is a plane view of the head positioner shown in FIG. 5;

FIG. 7 is a graph of a characteristic of a leaf spring used in the first embodiment of the present invention;

FIG. 8 is a block diagram of a positioning servo system to which the head positioner according to the first embodiment of the present invention is applied;

FIG. 9 is a graph of frequency responses of servo error of the head positioners shown in FIGS. 1 and 5;

FIG. 11 is a partially cutaway perspective view of a head positioner according to a second embodiment of the present invention;

FIG. 12 is a graph of a characteristic of a leaf spring used in the head positioner according to the second embodiment of the present invention;

DESCRIPTION OF THE PREFERRED EMBODIMENTS

In order to facilitate understanding of the present invention, a description will now be given of head positioners relating to the present invention.

Figure 1:
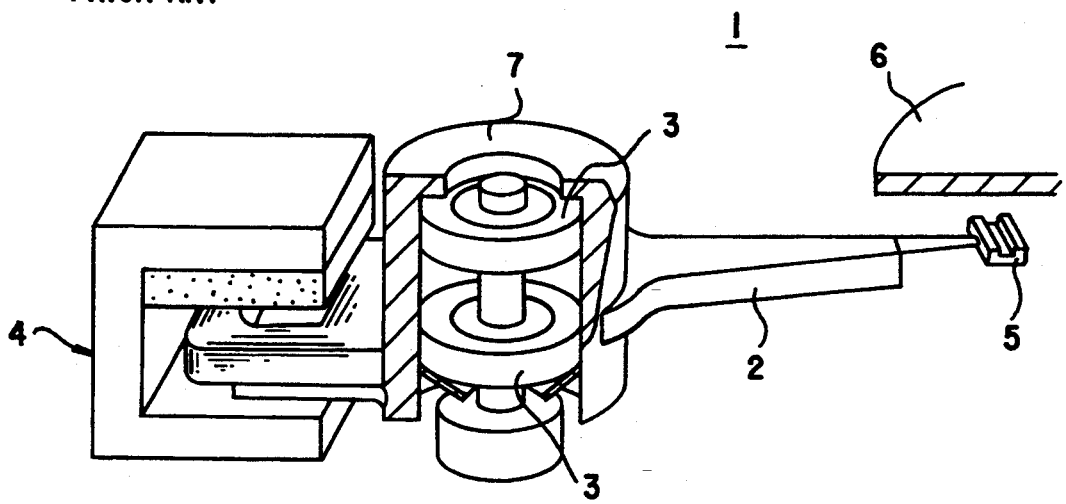
FIG. 1 is a partially cutaway perspective view of a related head positioner.

FIG. 1 shows a head positioner 1, which includes an arm 2 having a cylindrical member 7 pivotably supported by an antifriction bearing 3. An electromagnetic driving unit 4 accommodates a member projecting from the cylindrical member 7. When the electromagnetic driving unit 4 is activated, the arm 2 is caused to pivot about the antifriction bearing 3 and thereby a magnetic head 5 supported by the arm 2 is positioned on a target track formed on a magnetic disk 6.

Figure 2:
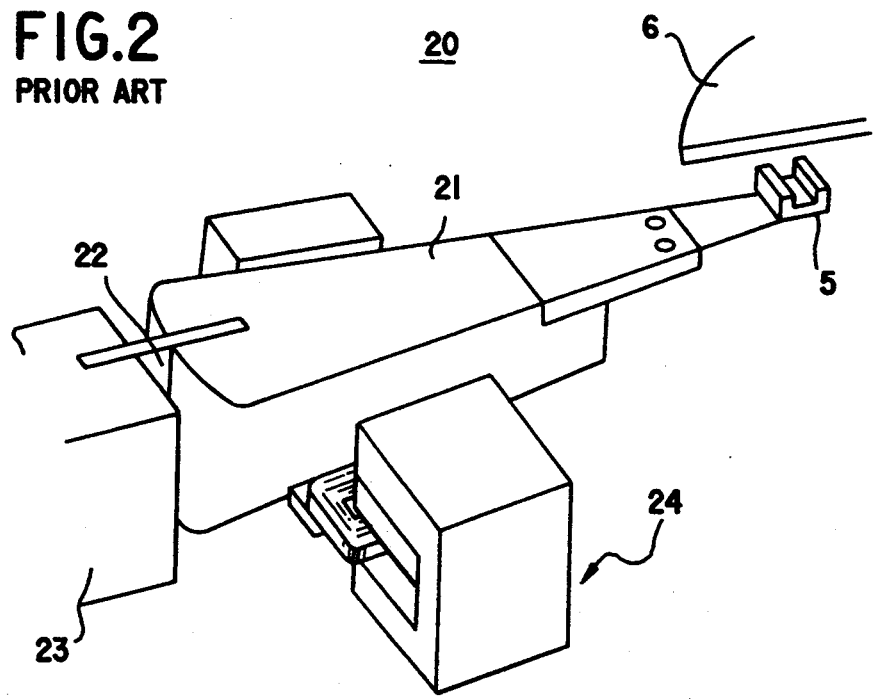
FIG. 2 is a partially cutaway perspective view of another related head positioner.

FIG. 2 shows another head positioner 20, in which a base portion of an arm 21 is supported by a stationary member 23 by means of a leaf spring 22. The arm 21 is pivotable in a state in which the leaf spring 22 is bent. When an electromagnetic driving unit 24 is activated, the arm 21 is caused to pivot, and the magnetic head supported by the arm 21 is positioned on a target track formed on the magnetic disk 6.

Figure 3:
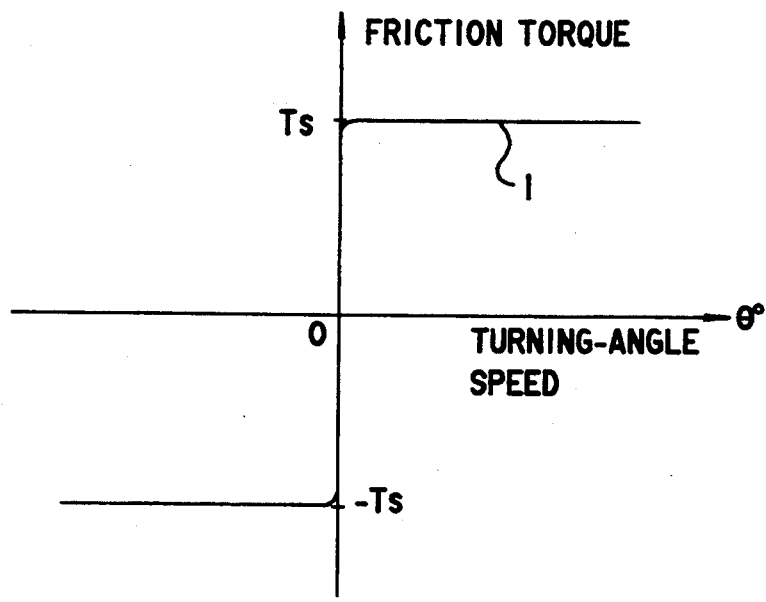
FIG. 3 is a graph of a friction characteristic of antifriction bearings shown in FIG. 1.

The antifriction bearing 3 shown in FIG. 1 has a relationship between friction torque and a turning-angle position $\theta$ as shown in FIG. 3. A curve I shown in FIG. 3 indicates the above relationship. More particularly, the antifriction bearing 3 has a static friction torque Ts. When a torque greater than the static friction torque Ts is generated, the arm 2 starts to pivot about the antifriction bearing 3 at the turning-angle position $\theta$ shown in FIG. 3. That is, the antifriction bearing 3 operates nonlinearly like a "stick-slip" manner.

Since the antifriction bearing 3 has the static friction torque Ts, a positioning servo system has a dead zone defined as Ts/K where K is the positioning stiffness of the positioning servo system. Hence, it is impossible to cause the magnetic head 5 to pivot by an angle corresponding to the dead zone. The dead zone is approximately equal to 1 $\mu$m measured on the magnetic disk. Hence, the head positioner 1 shown in FIG. 1 cannot provide a positioning precision less than 1 $\mu$m.

Figure 4:
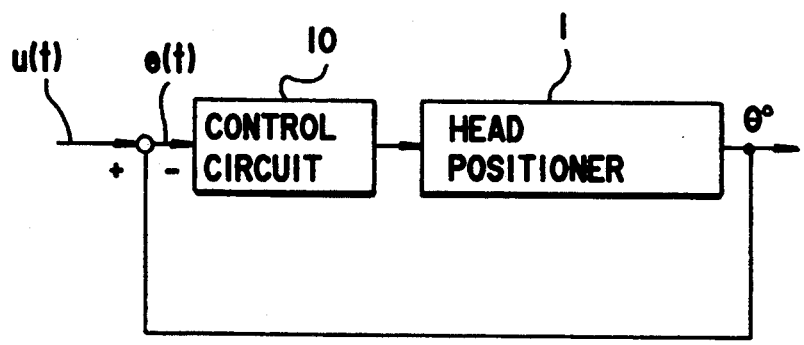
FIG. 4 is a block diagram of a positioning servo system to which the head positioner shown in FIG. 1 is applied.

FIG. 4 shows a position servo system to which the head positioner 1 shown in FIG. 1 is applied. The positioning servo system shown in FIG. 4 includes the head positioner 1 and a control circuit 10. The inventors measured a frequency response regarding a servo error of the positioning servo system shown in FIG. 4. In the experiment, an input signal u(t) having a sinusoidal wave having an amplitude of 1 $\mu$m was used. A servo error obtained by subtracting the turning-angle position $\theta$ from the input signal u(t) was measured. A curve II shown in FIG. 9 shows a frequency response regarding the servo error. The servo error is as large as approximately 0.5 $\mu$m for an input frequency of 60 Hz. This is caused due to the static friction torque Ts of the antifriction bearing 3.

In principle, the head positioner shown in FIG. 2 is superior to the head positioner shown in FIG. 1 because the leaf spring used in the head positioner in FIG. 2 does not have a non-linear behavior. However, it is required to cause the arm 21 to pivot within a wide range approximately equal to 20° and to cause the leaf spring 22 to bend greatly. When the leaf spring 22 is greatly bent, it has a great resilience, and a great steady-state deviation. Hence, the precision of the head positioner is degraded. As a result, it is very difficult to decrease the positioning precision to less than 1 $\mu$m. Further, the electromagnetic driving unit 24 consumes a large amount of energy. Furthermore, when the leaf spring 22 is bent many times, fatigue deformation or failure may occur in the leaf spring 22.

The present invention is intended to eliminate the above-mentioned disadvantages of the head positioners shown in FIGS. 1 and 2.

Figure 5:
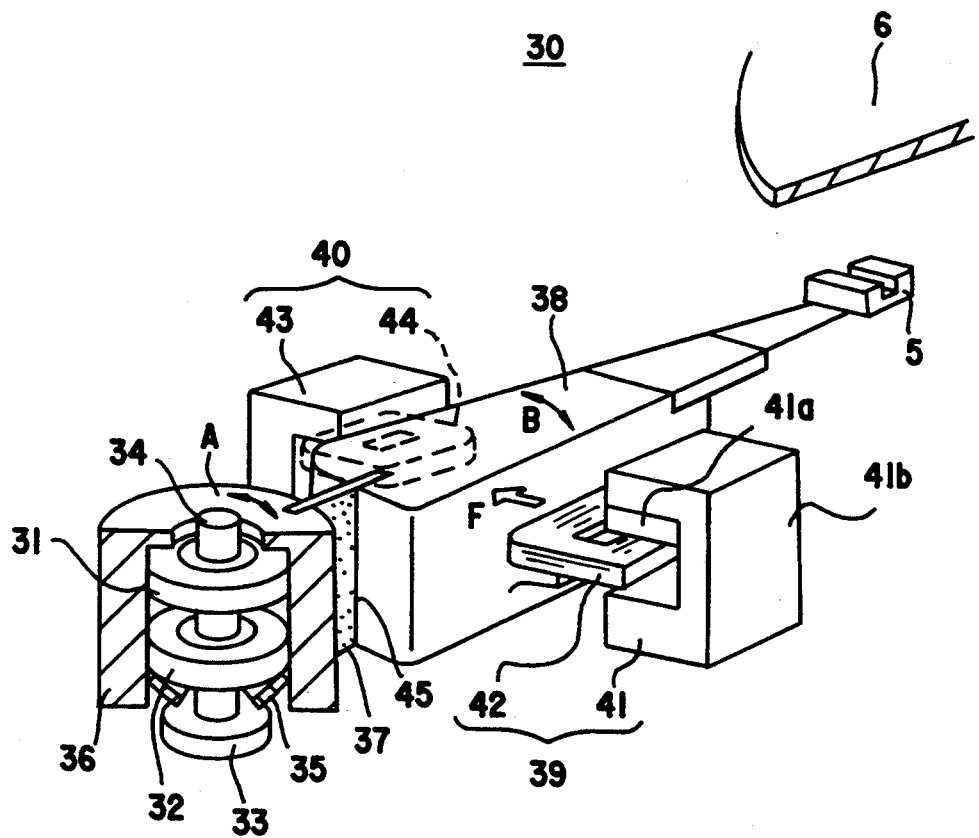
FIG. 5 is a partially cutaway perspective view of a head positioner according to a first embodiment of the present invention.

A description will now be given, with reference to FIGS. 5 and 6, of a head positioner according to a first embodiment of the present invention. Referring to FIG. 5, a head positioner 30 includes antifriction bearings 31 and 32, which are rotatably supported by a stationary shaft 34 embedded in a supporting base 33. A leaf spring 35 applies a pre-pressure to the antifriction bearings 31 and 32.

A first cylindrical pivotable member 36 has an inner wall to which peripheral portions of the antifriction bearings 31 and 32 are fixed. The first pivotable member 36 can be turned about the stationary shaft 34 in directions indicated by a two-headed arrow A. A metallic leaf spring 37 having a first end supported by the first pivotable member 36. A viscoelastic resin film 45, such as natural rubber or acrylate resin is formed on the surfaces of the leaf spring 37 in order to suppress vibration of the leaf spring 37. The leaf spring 37 has a linear relationship between the flexibility moment and the flexibility angle, as indicated by a curve III shown in FIG. 7.

A second arm-shaped pivotable member 38 is fixed to a second end of the leaf spring 37. The magnetic head 5 is mounted on an extreme end of the second pivotable member 38. When the leaf spring 37 is bent, the second pivotable member 38 is caused to pivot with respect to the first pivotable member 36 in directions indicated by a two-head arrow B. Further, the second pivotable member 38 is caused to pivot in the directions indicated by the arrow B when the first pivotable member 36 is caused to pivot.

Electromagnetic driving units 39 and 40 are provided on respective sides of the second pivotable member 38, and generate driving forces F, as shown in FIG. 6. The electromagnetic driving unit 39 includes a magnetic circuit 41, and a coil 42. The coil 42 is fixed to an end of a side wall of the second pivotable member 38, and is located in a gap of the magnetic circuit 41, which includes a permanent magnet 41a and a yoke 41b. The electromagnetic driving unit 40 includes a magnetic circuit 43 and a coil 44, which are arranged in the same manner as the magnetic circuit 41 and the coil 42. The magnetic circuit 43 includes a permanent magnet and a yoke in the same manner as the magnetic circuit 41.

When the first pivotable member 36 is kept stationary, the second pivotable member 38 forms a driving system supported by the leaf spring 37. This driving system has a node N of vibration due to a secondary resonance. As shown in FIG. 6, the electromagnetic driving units 39 and 40 are disposed so that the driving forces F are exerted on the node N and are oriented in a direction perpendicular to an axis 46 of the second pivotable member 38.

A description will now be given of the operation of the head positioner 30.

Currents are made to flow in the coils 42 and 44, and the electromagnetic driving units 39 and 40 generate the driving forces F dependent on the magnitude of the currents. When fine positioning is required, a small magnitude of the currents is made to flow in the coils 42 and 44. At this time, the driving forces F generated by the electromagnetic driving units 39 and 40 are small, and there is a small torque exerted on the first pivotable member 36 via the leaf spring 37. In this case, the torque is less than the static friction torque Ts of the antifriction bearings 31 and 32. Hence, the antifriction bearings 31 and 32 are kept stationary, and the second pivotable member 38 is caused to pivot in the direction indicated by the arrow B while the leaf spring 37 is bent. In this manner, the magnetic head is positioned on the target track on the magnetic disk 6.

The leaf spring 37 does not experience any non-linear behavior such as a "stick-slip" motion. Hence, the magnetic head 5 can be positioned with a precision of the order of submicron.

When a large magnitude of the currents is given to the coils 42 and 44, the electromagnetic driving units 39 and 40 generate large driving forces F. Hence, the leaf spring 37 is greatly bent, and a large torque is exerted on the first pivotable member 36. In this case, the torque is greater than the static friction torque Ts. Hence, the antifriction bearings 31 and 32 are turned, and the first pivotable member 36 is caused to pivot in the direction indicated by the arrow A so that the first pivotable member 36 follows the second pivotable member 38. That is, the second pivotable member 38 is turned together with the first pivotable member 36. As a result, the magnetic head 5 can be moved a long distance.

After the magnetic head 5 is moved a long distance, the aforementioned fine positioning control is carried out in the state in which the first pivotable member 36 is kept stationary. At this time, the leaf spring 37 is slightly bent, and has a very small steady-state deviation. In this manner, the magnetic head 5 can be positioned with a precision in the submicron order. Further, a small amount of currents flows in the coils 42 and 44, and the electromagnetic driving units 39 and 40 consumes a small amount of energy. Furthermore, the leaf spring 37 is slightly bent, and does not undergo fatigue failure.

A description will now be given of the results of measurement of the frequency response regarding servo error of a positioning servo system to which the head positioner 20 is applied.

FIG. 8 shows a positioning servo system to which the head positioner 20 is applied. The system structure shown in FIG. 8 is almost the same as that shown in FIG. 4. The sinusoidal input signal u(t) having an amplitude of 1 μm was applied to the positioning servo system and the servo error e(t) was measured. The measurement result is indicated by a curve IV shown in FIG. 9. The servo error is approximately equal to 0.01 μm for an input frequency of 60 Hz. Such a value of the servo error of the approximately 1/50 of that of the servo error of the positioning servo system shown in FIG. 4. This is because the leaf spring 37 is bent within the range of the static friction torque Ts.

A description will now be given of a vibration characteristic of the head positioner 30 obtained in the state in which the first pivotable member 36 is kept stationary, that is a vibration characteristic of the second pivotable member 38 supported by the leaf spring 37.

It is necessary to take into account a vibration characteristic of a vibration system supported by the leaf spring 37. An experiment was conducted in which the turning angle of the second pivotable member 38 due to the driving force F was measured as the frequency changed.

Figure 10A:
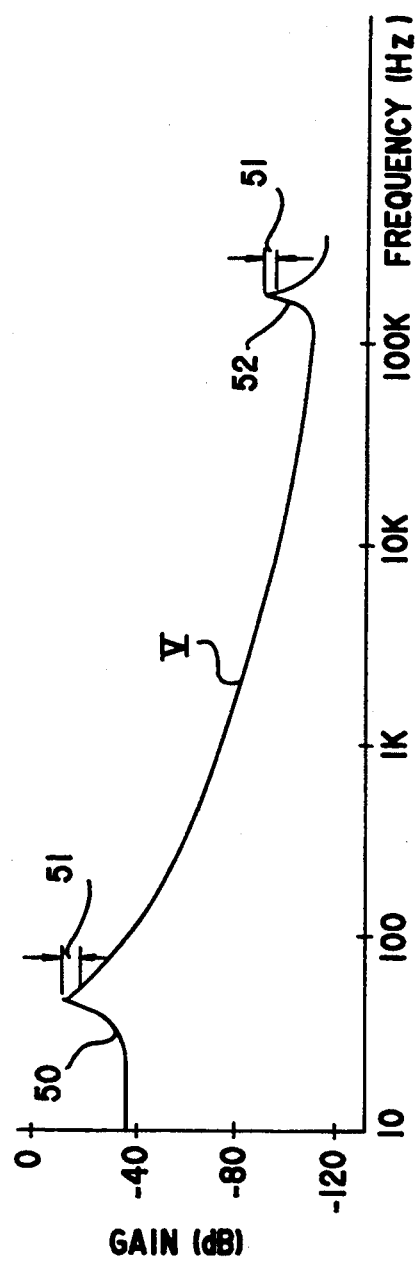
FIGS. 10A and 10B are graphs of vibration characteristics of a second pivotable member with respect to a first pivotable member used in the head positioner according to the first embodiment of the present invention.
Figure 10B:
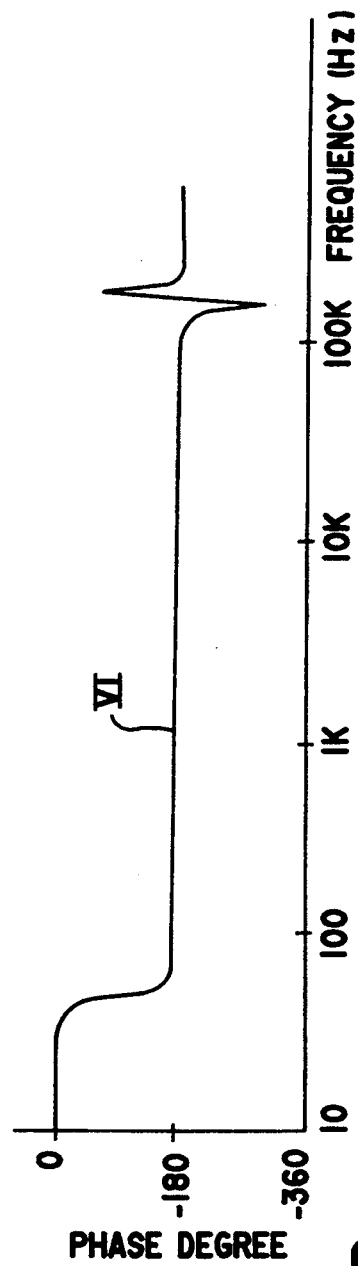

FIG. 10A shows a gain vs. frequency characteristic, and FIG. 10B shows a phase vs. frequency characteristic. The gain of the vibration system is indicated by a curve V shown in FIG. 10A. The gain vs. frequency characteristic curve V has a peak due to the primary resonance located at a frequency of approximately 80 Hz. A reference number 51 indicates a suppressed gain due to the visco-elastic resin film 45. Since the driving forces F are exerted on the node N and no moment about the node N is exerted on the second pivotable member 38, the secondary resonance is greatly suppressed. It is expected to observe the secondary resonance at a frequency of approximately 200 Hz. However, the characteristic curve V does not have any peak at a frequency of approximately 200 Hz. A reference number 52 shows a peak due to the third-order resonance, which occurs at a high frequency of approximately 120 kHz.

The phase of the vibration system is indicated by a curve VI shown in FIG. 10B. A phase inversion does not occur at a frequency of 200 Hz but occurs at a high frequency of approximately 200 kHz. That is, the phase inversion occurs in a frequency greatly higher than a frequency range in which the head positioner 30 operates. It can be seen from the FIGS. 10A and 10B that the second pivotable member 38 can be stably pivoted with respect to the first pivotable member 26.

Figure 11A:
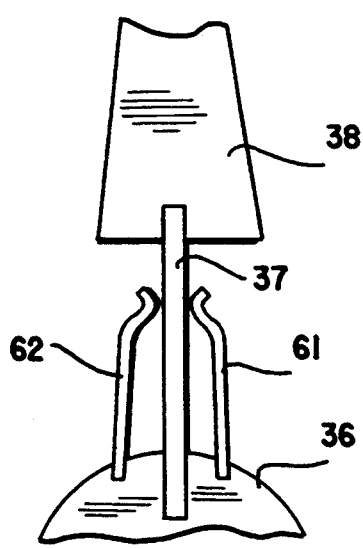
FIG. 11A is a partial top view illustrating the leaf springs of the head positioner of the second embodiment shown in FIG. 11.

A description will now be given, with reference to FIGS. 11 and 11A, of a head positioner 60 according to a second embodiment of the present invention. In FIG. 11, parts that are the same as parts shown in the previously described figures are given the same reference numbers.

The head positioner 60 includes leaf springs 61 and 62, each having a first end fixed to the first pivotable member 36, and a second free end. The leaf springs 61 and 62 are located on the respective sides of the leaf spring 37 and are spaced apart from the leaf springs 37. The leaf springs 61 and 62 have respective curved portions, and have a spring constant greater than that of the leaf spring 37. A viscoelastic resin film is formed on the surfaces of each of the leaf springs 61 and 62.

Only the leaf spring 37 is bent within a fine range. When the leaf spring 37 is more greatly bent, the leaf spring comes into contact with either the leaf spring 61 or 62, so that the leaf spring 61 or 62 is bent. As a result, the flexibility stiffness of the leaf spring 37 is abruptly increased.

FIG. 12 shows the relationship between the flexibility moment and the flexibility angle of the leaf spring 37 cooperating with the leaf springs 61 and 62. As indicated by a curve VII shown in FIG. 12, when the leaf spring 37 is bent by a constant angle or more, the flexibility stiffness (moment) is abruptly increased, so that the spring system made up of the leaf springs 37, 61 and 62 functions as a non-linear spring. Hence, the moment functioning to turn the first pivotable member 36 is abruptly increased when the leaf spring 37 is bent by the constant angle or more. Hence, the first pivotable member 36 is certainly caused to pivot. The degree of bending of the leaf spring does not exceed the constant angle, and the steady-state deviation can be greatly suppressed. Thus, the magnetic head 5 can be precisely positioned.

Figure 13:
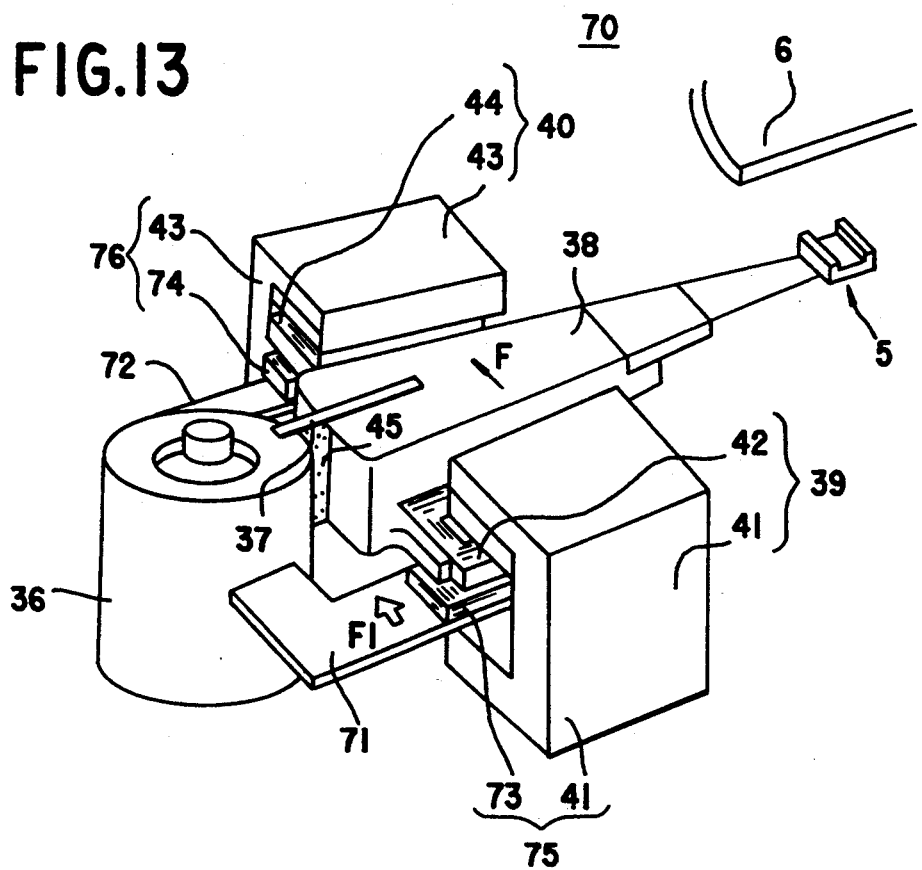
FIG. 13 is a partially cutaway perspective view of a head positioner according to a third embodiment of the present invention.

A description will now be given, with reference to FIG. 13, of a head positioner 70 according to a third embodiment of the present invention. In FIG. 13, parts that are the same as parts shown in the previously described figures are given the same reference numbers.

Arm members 71 and 72 extend from the first pivotable member 36. Coils 73 and 74 are mounted on leading ends of the arm members 71 and 72, respectively. The coil 73 is disposed in the magnetic circuit 41 together with the coil 42. The coil 74 is disposed in the magnetic circuit 43 together with the coil 44. The numbers of turns of the coils 73 and 74 are less than the numbers of turns of the coils 42 and 44.

The magnetic circuit 41 and the coil 73 form an additional electromagnetic driving unit 75. Similarly, the magnetic circuit 41 and the coil 74 form another additional electromagnetic driving unit 76. When the electromagnetic driving units 39 and 40 and the additional driving units 75 and 76 are driven, not only the aforementioned driving forces F but also additional driving forces F1 are generated. More particularly, the driving forces F causing the second pivotable member 38 to pivot are generated by the coils 42 and 44, and are exerted on the member 38. The forces F1 causing the first pivotable member 36 to pivot are generated by the coils 73 and 74 and are exerted on the member 36. Since the numbers of turns of the coils 73 and 74 are less than the number of turns of the coils 42 and 44, the driving forces F1 are less than the driving forces F. Hence, the first pivotable member 36 is caused to pivot so that it follows the second pivotable member 38. With the above structure, it is possible to reduce the degree of bending of the leaf spring 37 and the steady-state deviation and to precisely position the magnetic head 5.

Figure 14:
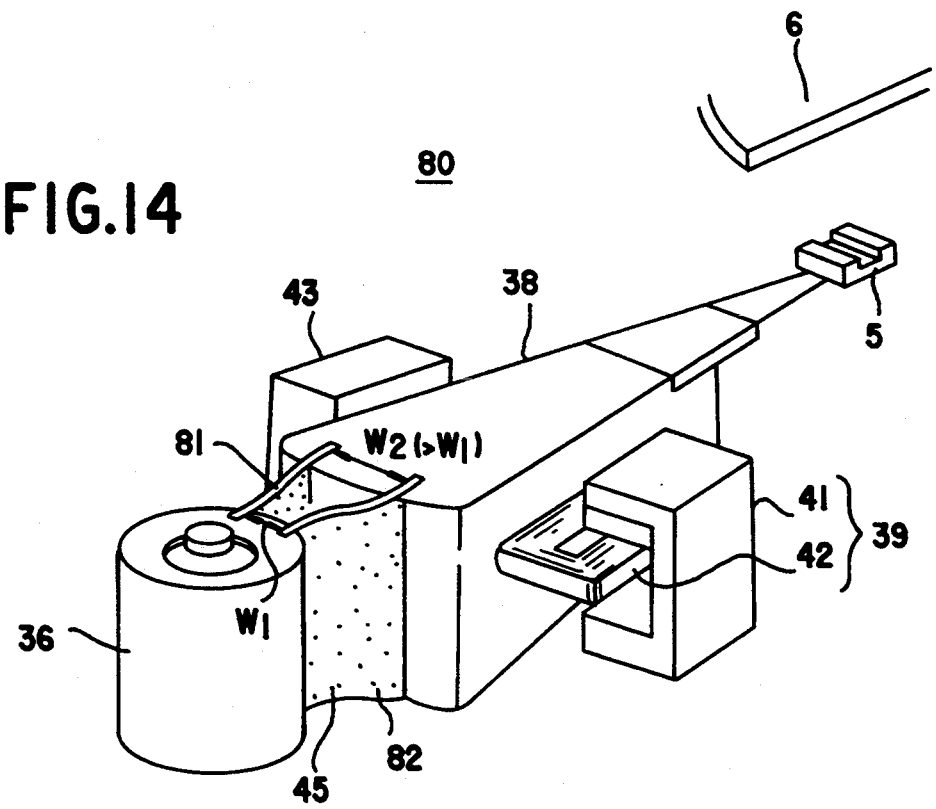
FIG. 14 is a perspective view of a head positioner according to a fourth embodiment of the present invention.

A description will now be given, with reference to FIG. 14, of a head positioner 80 according to a fourth embodiment of the present invention. In FIG. 14, parts that are the same as parts shown in the previously described figures are given the same reference numbers.

The head positioner 80 has leaf springs 81 and 82, which are fastened between the first pivotable member 36 and the second pivotable member 38 in such a manner that the leaf springs 81 and 82 are elastically bent in an S-shaped form and are symmetric to each other with respect to the longitudinal direction of the second pivotable member 38. One end of the leaf spring 81 and one end of the leaf spring 82 are supported to the first pivotable member 36 so that these ends are embedded therein. The other end of the leaf spring 81 and the other end of the leaf spring 82 are supported by the second pivotable member 38 so that these ends are embedded therein. The leaf springs 81 and 82 are spaced apart from each other by a distance W1 in the first pivotable member 36, and by a distance W2 in the second pivotable member 38. The distance W2 is greater than the distance W1. Stress is exerted on the leaf springs 81 and 82 because these springs are held in the elastically deformed state. Hence, it is difficult for a deformation due to a high-order resonance mode to occur. A visco-elastic resin film may be formed on the surfaces of each of the leaf springs 81 and 82.

Figure 15A:
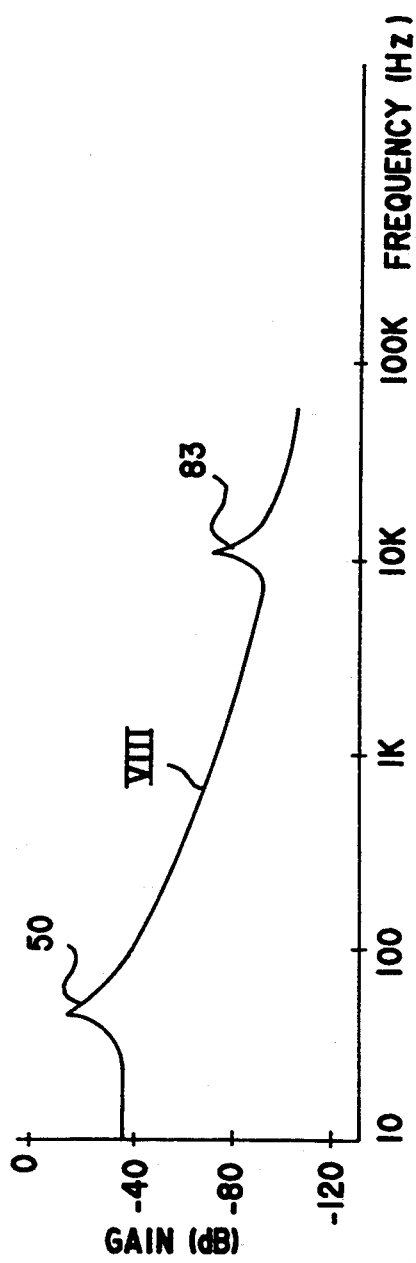
FIGS. 15A and 15B are graphs of vibration characteristics of a second pivotable member with respect to a first pivotable member used in the head positioner according to the fourth embodiment of the present invention.
Figure 15B:
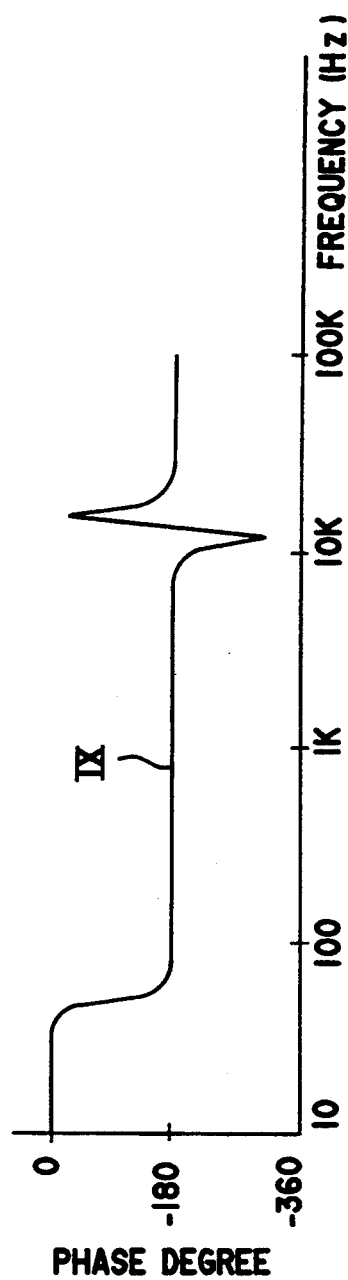

FIG. 15A shows a gain vs. frequency characteristic of a vibration system in which the first pivotable member 36 is kept stationary, and FIG. 15B shows a phase vs. frequency characteristic thereof. A curve VIII indicating the gain vs. frequency characteristic has a peak 83 due to the secondary resonance. The peak 83 occurs at a high frequency approximately equal to 10 kHz. A curve IX shown in FIG. 15B indicates the phase vs. frequency characteristic. It can be seen from the curve IX that the phase inversion does not occur at approximately 10 kHz or less. Hence, the head positioner 80 has good vibration characteristics and can stably position the magnetic head 5.

Figure 16:
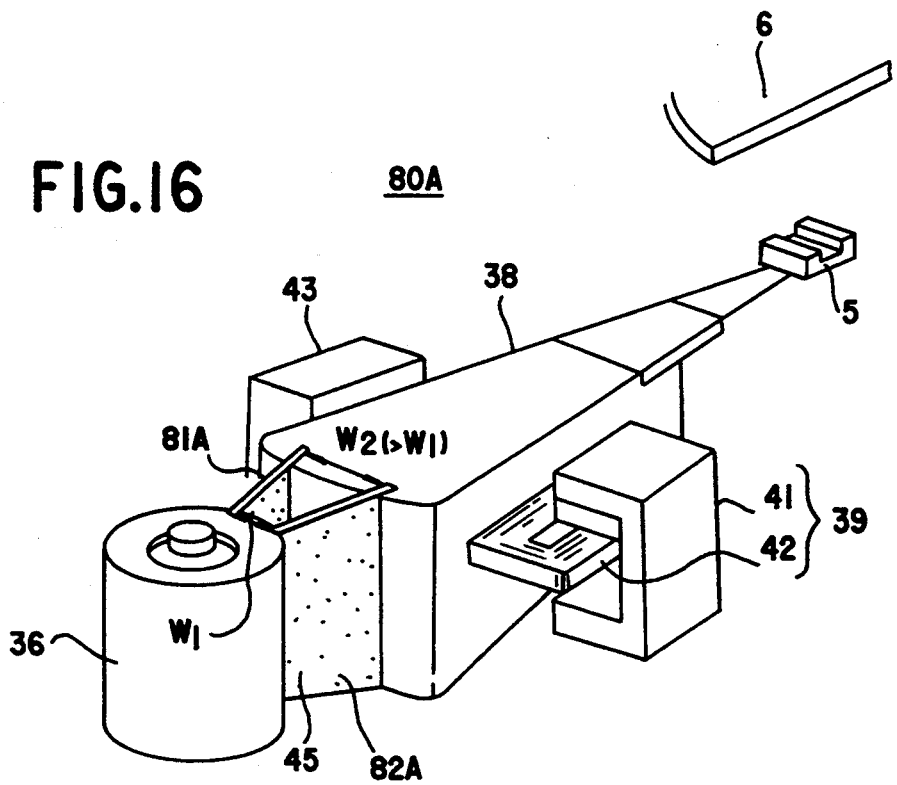
FIG. 16 is a perspective view of a variation of the head positioner according to the fourth embodiment of the present invention.

FIG. 16 shows a variation 80A of the structure shown in FIG. 14. In FIG. 16, parts that are the same as parts shown in FIG. 14 are given the same reference numbers. Leaf springs 81A and 82A are used instead of the leaf springs 81 and 82 shown in FIG. 14. The leaf springs 81 and 82 are not curved, but flat. In other words, the leaf springs 81A and 82A are plate-shaped leaf springs. The distance W2 between the leaf springs 81A and 82A at the second pivotable member 38 is greater than the distance W1 at the first pivotable member 36. It has been confirmed that the variation 80A shown in FIG. 16 has good gain vs. frequency characteristics and good phase vs. frequency characteristics.

The present invention is not limited to the specifically disclosed embodiments, and variations and modifications may be made without departing from the scope of the invention.

For example, one of the two electromagnetic driving units may be used. Leaf springs other than the aforementioned springs may be used. Further, essential parts of the embodiments may be combined with each other.

What is claimed is:

1. A head positioner for a storage disk, said head positioner comprising:
    an antifriction bearing supported by a stationary base;
    a first pivotable member pivotably supported by the antifriction bearing about a first pivot axis;
    a second pivotable member;
    a read/write head supported on said second pivotal member;
    a flexible member pivotably supporting said second pivotable member by the first pivotable member;
    said flexible member including at least one leaf spring having a first end fixed to the first pivotable member and having a second end fixed to the second pivotable member, said at least one leaf spring being flexible in a direction which is transverse to a line between said first pivotable member and said second pivotable member and which is generally perpendicular to said first pivot axis; and
    first driving means for generating a first driving force in said direction against a side of said second pivotable member causing the second pivotable member to pivot with respect to the first pivotable member through flexion of the at least one leaf spring.

2. The head positioned as claimed in claim 1, wherein said second pivotable member and the flexible member form a vibration system, and wherein said vibration system is capable of vibrating in a secondary resonance mode, and wherein said first driving means is positioned such that the first driving force is exerted on a node of the secondary resonance mode.

3. The head positioner as claimed in claim 1, wherein said flexible member comprises a single leaf spring.

4. The head positioner as claimed in claim 3, wherein said flexible member includes a vibration absorbing member formed on the leaf spring.

5. The head positioner as claimed in claim 1, wherein said flexible member comprises:
    a first leaf spring having a first end fixed to the first pivotal member and a second end fixed to the second pivotal member;
    a second leaf spring having a first end fixed to the first pivotal member and a second free end; and
    a third leaf spring having a first end fixed to the first pivotal member and a second free end;
    the second and third leaf springs being located on respective sides of the first leaf spring.

6. The head positioner as claimed in claim 1, further comprising second driving means for generating a second driving force in said direction against the other side of said second pivotable member causing the first pivotable member to pivot with respect to the first pivotable member through flexion of the at least one leaf spring.

7. The head positioner as claimed in claim 6, wherein the second driving force has a magnitude less than that of the first driving force.

8. The head positioner as claimed in claim 1, wherein the flexible member comprises a pair of leaf springs fastened to the first and second pivotable members in a state in which the pair of leaf springs is elastically deformed, wherein said pair of leaf springs are elastically deformed by prestressing.

9. The head positioned as claimed in claim 1, wherein the flexible member comprises a pair of leaf springs respectively fastened to the first and second pivotable members, said pair of leaf springs comprising flat-shaped leaf springs.

10. The head positioner as claimed in claim 1, wherein said first driving means comprises a first electromagnetic driving unit located on a first side of the second pivotable member, and a second electromagnetic driving unit located on a second side of the second pivotable member, the first side and the second side being opposite to each other.

11. The head positioner as claimed in claim 10, wherein:
    the first electromagnetic driving unit comprises a first coil fastened to the second pivotable member, and a magnetic circuit including a permanent magnet and a yoke; and the second electromagnetic driving circuit comprises a second coil fastened to the first pivotable member, and said magnetic circuit.

12. A head positioner for a storage disk, said head positioner comprising:

an antifriction bearing supported by a stationary base;

a first pivotable member pivotably supported by the antifriction bearing such that said first pivotable member is pivotable around a first pivot axis extending up through said antifriction bearing;

a second pivotable member;

a read/write head supported on said second pivotal member;

a flexible member pivotably supporting said second pivotable member by the first pivotable member;

said flexible member having a first end fixed to the first pivotable member and having a second end fixed to the second pivotable member, said flexible member being flexible in a direction which is transverse to a axis between said first pivotable member and said second pivotable member and which is generally perpendicular to said first pivot line; and first driving means for generating a first driving force in said direction against a side of said second pivotable member causing the second pivotable member to pivot with respect to the first pivotable member through flexion of the flexible member.

* * * * *